United States Patent

Prikryl et al.

[15] 3,677,108
[45] July 18, 1972

[54] DISENGAGEABLE MANUAL CONTROL

[72] Inventors: Walter F. Prikryl, Houston; Ronald A. Gulick, Sugarland, both of Tex.

[73] Assignee: Research Engineering Company, Houston, Tex.

[22] Filed: Aug. 31, 1970

[21] Appl. No.: 68,427

[52] U.S. Cl..............................74/625, 74/424.8 B, 251/229
[51] Int. Cl.......................................................F16h 25/00
[58] Field of Search..............74/89.15, 625, 424.8 B, 89.15, 74/504, 104; 251/229, 231, 234

[56] References Cited

UNITED STATES PATENTS

| | | |
|---|---|---|
| 3,536,094 | 10/1970 | Manley, Jr..........................137/516.11 |
| 3,585,974 | 6/1971 | Weber....................................251/229 |
| 383,063 | 5/1888 | Murphy..............................74/424.8 A |
| 2,704,947 | 3/1955 | Hopkins....................................74/625 |
| 752,490 | 2/1904 | Walker...............................74/424.8 A |
| 1,017,619 | 2/1912 | Gallan................................74/424.8 A |
| 3,063,298 | 11/1962 | Elliott....................................74/89.15 |
| 3,318,171 | 5/1967 | Wilkinson et al......................74/89.15 |

Primary Examiner—Milton Kaufman
Assistant Examiner—Wesley S. Ratliff, Jr.
Attorney—Robert W. B. Dickerson

[57] ABSTRACT

A disengageable, manually operable device for causing movement of a further object; the disengageable portion having a pair of mating threaded members, and facilities for separating them, thereby disengaging the device.

9 Claims, 2 Drawing Figures

Walter F. Prikryl
Ronald A. Gulick
INVENTORS

Walter F. Prikryl
Ronald A. Gulick
INVENTORS

3,677,108

DISENGAGEABLE MANUAL CONTROL

BACKGROUND OF THE INVENTION

Actuators or operators have long been used to effect or deter particular operations involving other items of equipment. For example, such operations include causing the opening and/or closing of valves. It is quite common for the operator itself to derive its motive force from hydraulic pressure exerted against a piston, such piston motion, in turn, causing motion of the valve moving portion. It is oftentimes desirable to have a back-up or additional means for causing motion of the valve — or whatever device is being activated. This additional feature, while present on some of the prior art devices, has oftentimes been extremely clumsy, bulky, and thereby, not only been expensive, but also occupied sufficient space as to decrease its utility. Thus, the problem to which this invention is directed, is the provision of a compact back-up operating mechanism, capable of ready disengagement.

SUMMARY OF THE INVENTION

While a particular type operator is depicted herein, it will become obvious that the structural features of the control system would have application in other "operators" as well as in other control mechanisms where disengageable operating devices are desired. Herein, a piston is provided in a cylinder, which, in turn, is linked to the operator housing. Hydraulic pressure may cause piston movement and thereby rotation of a yoke mechanism, which mechanism can cause valve rotation. The piston rod itself is fixed to a connector member, said connector including a pin and roller which cause rotatory motion of the valve rotating yoke. A splined rod extends substantially through the housing, is rotatable by virtue of an exterior lever, and carries a cam member. A partial nut is carried along with said connector, and is disengageably engageable with a threaded handle rod. Such engageability is governed by said cam device. During engagement, rotation of the handle rod causes linear movement of the connector, and thereby rotatory motion of the yoke.

During disengagement, operation of the handle rod is ineffective, and yoke rotation is dependent on hydraulic operation.

DESCRIPTION OF A PREFERRED EMBODIMENT

Figure 1:
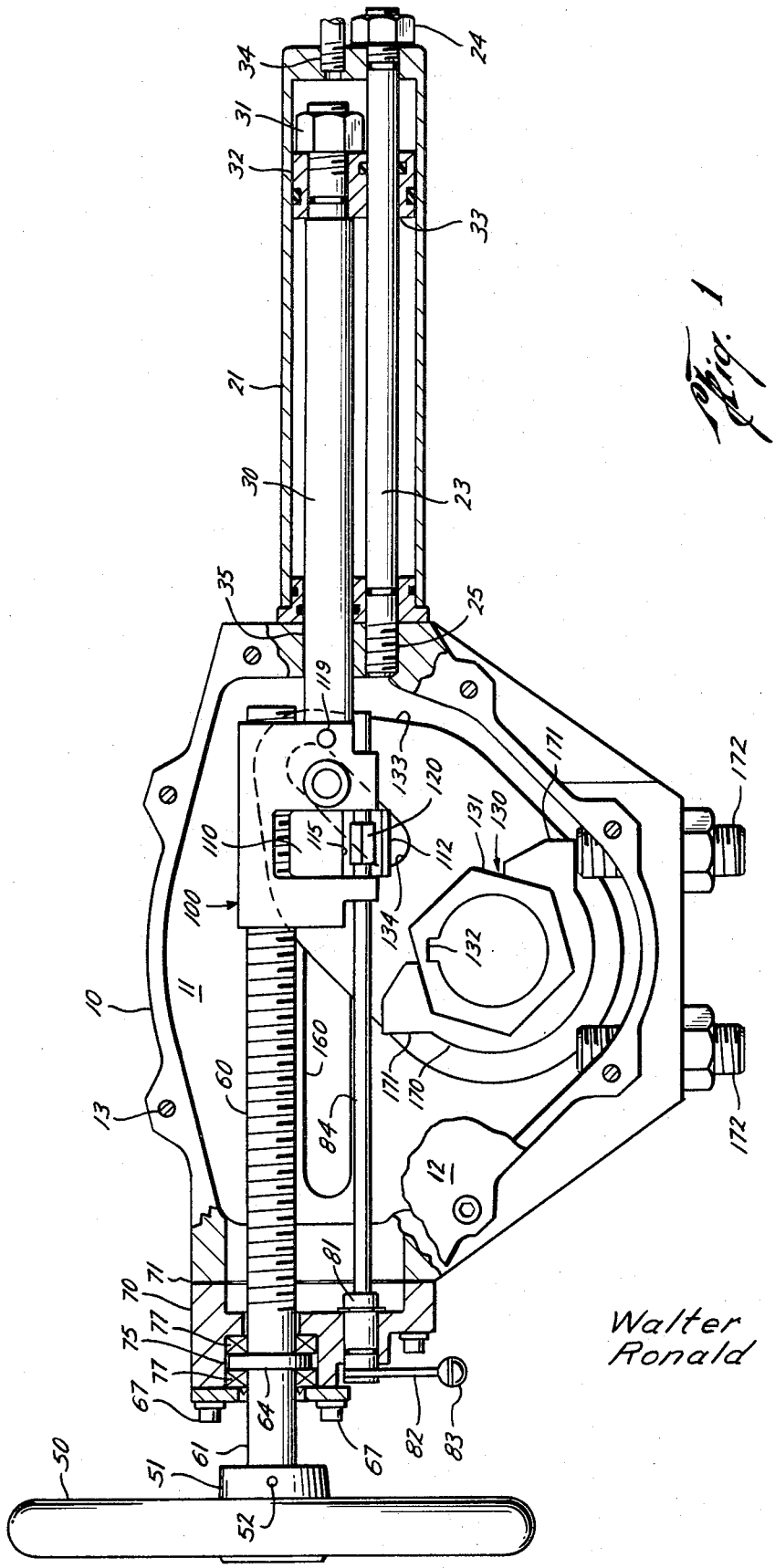
FIG. 1 is an elevation of the assembled operator, partly in section and with most of the cover removed to reveal the internal mechanism.

This operator of this invention includes a hollow central housing body 10. Rear plate 11 may be integral therewith and cover plate 12 may be removably affixed thereto by a plurality of screws through threaded apertures, such as 13. Cover gasket 14 would be positioned intermediate members 10 and 12.

On opposite sides of the central housing are, respectively, means for causing hydraulic operation, and, on the other, disengageable back-up means for operation. Although the latter is of primary concern, both will be described hereinafter.

First, consider hydraulic operation, or the like, as depicted. Cylinder 21 is connected at one end to the side of housing body 10, by virtue of cylinder adapter or head 22, appropriate seals, such as O-rings, being provided for sealing engagement. The cylinder may be affixed to the housing by virtue of tie bar 23 which extends throughout cylinder 21, threadedly is engaged by nut 24 at one end thereof, and is threadedly fixed to the body housing at its other end, by virtue of aperture 25, provided in such body. Also positioned partially within cylinder 21 is piston rod 30, which has piston nut 31 threadedly positioned at one end, thereby positioning near said one end, piston 32. The piston is apertured so as to permit affixation to its piston rod, and is further apertured at 33 so as to permit sliding engagement with tie rod 23. Inasmuch as the piston and piston rod reciprocate within cylinder 21, under hydraulic pressure, the normal seals would be provided the piston in a conventional manner. Such pressurized fluid may, for example, enter the cylinder through appropriate conduits leading to port 34, and through similar porting (not shown) at or near the opposite end of the cylinder. It is seen in FIG. 1, that one end of the piston rod reciprocatingly extends within the central cavity of body portion 10. Appropriate bearing means may be provided aperture 35 in the side wall of housing 10.

Moving now to the opposite side of each of the figures, hand wheel 50 includes a hub portion 51 which is joined by pin 52 to the unthreaded shank portion 61 of handle screw 60. Member 60 includes a threaded portion 63, extending a substantial part of its length, and well into the interior cavity of housing 10. Bearing plate 70, and its related gasket 71, are joined to housing 10, opposite cylinder 21. Flange 64 on handle screw 60, which generally separates the threaded and unthreaded portion thereof, is positioned within outwardly directed cavity 75 of bearing plate 70. As shown in FIG. 1, flange 64, along with the base of cavity 75 and bearing cover 66, the latter being affixed to plate 70 by screws 67, serve to position and limit bearing assemblies 77, each of which may include a centrally disposed needle thrust bearing intermediate thrust races. Below hand wheel or handle 50, as seen in FIG. 1, a shaft includes hub portion 81 rotatably fixed within an aperture in assembly 70. The hub is apertured to receive pin 82, which may have ball 83 on the end thereof, to act as a rotatable handle. Extending from hub 81 is a splined portion 84 of the shaft, which extends well within the cavity of housing 10. Thus, the splined portion may be rotated, by rotation of handle 82, 83. Within such cavity, split nut retainer 100 includes lug extension 101, and cutaway portion 102. An unthreaded aperture 104 extends throughout the length of member 100 (excluding, of course, the cutaway). The upper surface 105 of the cutaway may be concave in configuration so as to accommodate handle screw 60, which is slidingly receivable by apertures 104. Positioned within cutaway 102 is split nut 110, which includes concave threaded portion 111 and a ledge portion 112 which forms a receiving means for splined rod 84. It will be seen that the end of splined rod 84, opposite hub 81, passes through apertures within lug extension 101 of split nut retainer 100, and through the receiving portion delineated by ledge 112 of split nut 110. Within this last delineated portion, member 84 also carries cam 120, which rotates with rod 84. On proper rotation, said cam will abut against surface 115 of the split nut, forcing it upwardly into threaded engagement with threaded rod 60. Obviously, at this stage, rotation of handle 50 will cause linear movement of split nut 110, and thereby similar linear movement of split nut retainer 100, by virtue of the split nut pushing against the sides of cutaway portion 102. By rotating pin 82, and thereby rod 84, the opposite direction, the cam will no longer cause threaded interaction between rod 60 and the split nut. At this stage, rotating handle 50 will cause no motion of nut retainer 100. It also should be noted that one end of piston rod 30 is fixed to nut retainer 100 by pin 109 passing through aperture 119 in nut retainer 100, and a mating (not shown) aperture near the end of the piston rod.

Figure 2:
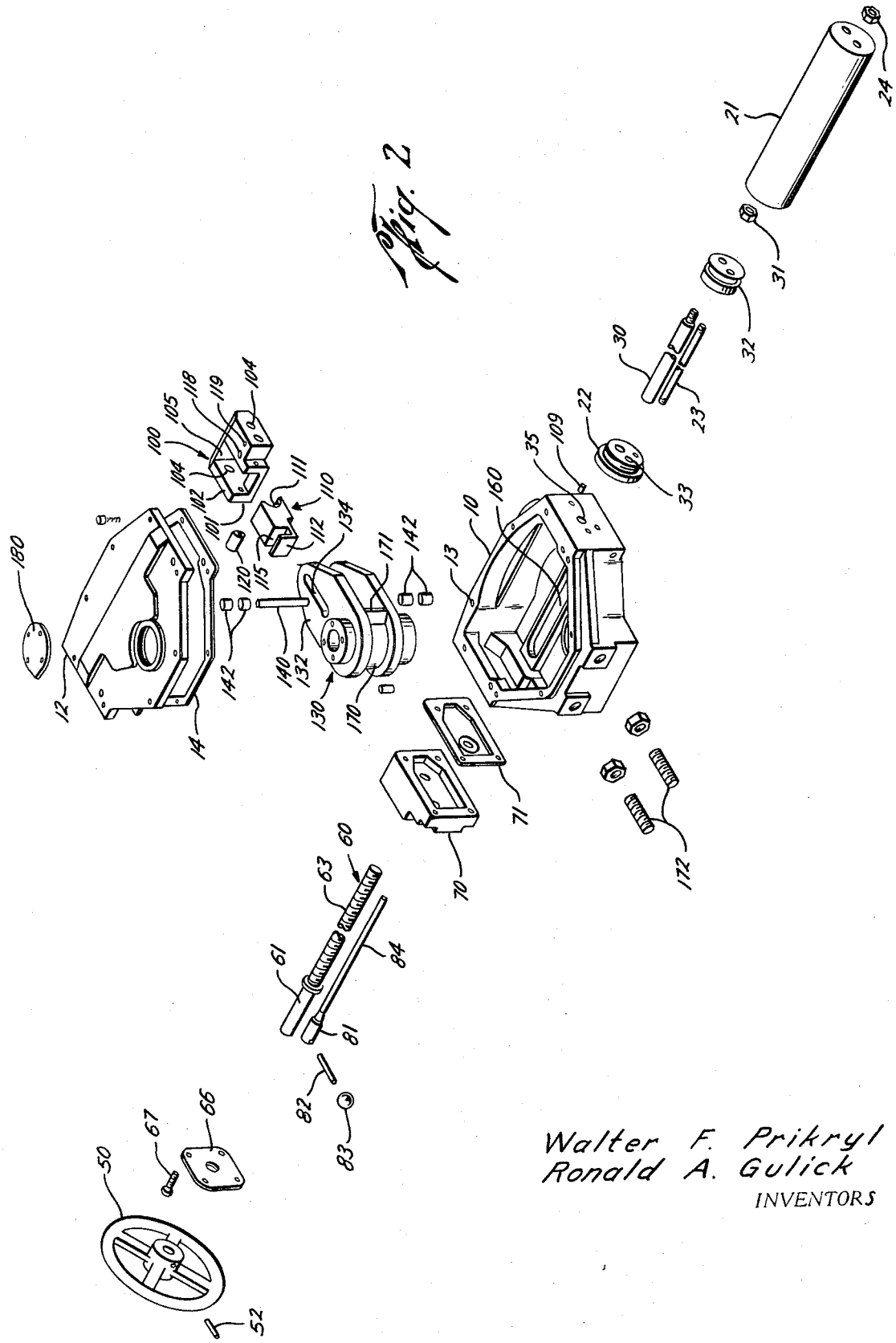
FIG. 2 is an exploded perspective showing many of the component parts thereof.

Also within the cavity of housing 10, the stem 131 of yoke 130 is positioned, keyed at 132 to receive a portion of a valve member or the like, and has its ends supported in suitable bearings within plates 11 and 12 of housing 10. The yoke includes upper and lower arms, 132, 133, only the lowermost being shown in FIG. 1. Each arm is slotted, as at 134. Pin 140 is carried by aperture 118 in the split nut retainer (see FIG. 2). The pin further carries rollers 142 at either end, to engage the surfaces of slots 134 in the yoke arm and the sides of track portions 160, provided in both of plates 11 and 12 (no such track being shown in cover plate 12). Intermediate yoke arms 132, 133, flange member 170 has ears 171 affixed to the yoke stem. The ears may abut against, and thereby limit yoke motion, stop screws 172 which may adjustably thread into housing 10. An indicator device 180 may be affixed to one end of the yoke stem so as to indicate the position of such stem and related equipment, example, valve stem.

Generally speaking then, when hydraulic pressure is supplied, the piston rod reciprocation will cause linear motion of member 100. This member is pin-connected to the slots formed in the yoke arms. Thus, linear movement of nut retainer 100 causes rotatory motion of the yoke, and thereby operation of any linked member. Naturally, the split nut is out of engagement with rod 60 at this stage. On manual operation becoming desirable, handle portion 82, 83 may be rotated, thereby, by virtue of splined rod 84, causing rotating cam 120 to abut against threaded split nut 110 causing it to engage with threaded rod 60. Thus, on rotation of hand wheel 50, member 100 will be caused to move linearly, thereby rotating yoke 130. Thus, an efficient and compact disengageable auxiliary power transmission means is provided. Although shown in connection with an operator or actuator mechanism, and particularly described with respect to a valve operator, it should be apparent that the particular disengageable structure shown and described herein will find utility in many related areas of power transmission, and that the invention is intended to be limited only by the following appended claims.

We claim:

1. In an actuator having piston actuatable means to rotate a valve stem, the improvement comprising:
   manually actuatable means to rotate said valve stem; means for releasably coupling said manually actuatable means to said valve stem, said coupling means includes;
   a traveling member slidably engageable with a threaded rod portion of said manually actuatable means, and a threaded partial nut releasably threadedly engaged with said threaded rod, and means for releasably coupling said nut and threaded rod, said traveling member including means for moving said nut therealongwith when said nut and rod are both coupled and not coupled.

2. The actuator of claim 1 wherein said piston actuatable means includes piston and piston rod, said piston rod is fixed to said traveling member.

3. In an actuator having a housing portion and piston actuatable means to cause rotation of a yoke mechanism, the improvement comprising:
   manually operative rotating means positioned at least partially exterior of said housing, means for releasably coupling said rotating means to said yoke mechanism, whereby on said latter two members being coupled, rotation of said rotating means causes rotation of said yoke mechanism and on said two members being uncoupled such rotation of said rotating means is ineffective to cause such rotation of said yoke mechanism, said coupling means includes:
   traveling member slidably engageable with a threaded rod portion provided said rotating means, a threaded partial nut releasably coupled to said threaded rod, and means for releasably coupling said nut and said threaded rod;
   said traveling member is fixed to a piston rod of said piston actuatable means, and said coupling means includes a shaft having a cam member affixed thereto, said shaft being so positioned as to assumed a plurality of positions, at least one of which causes said cam member to force said partial nut into threaded engagement with said threaded rod, and another of such positions uncouples said partial nut and said threaded rod.

4. A device for engaging and disengaging a traveling member from a threaded rod, said device including:
   a rotatable threaded rod;
   a traveling member, said traveling member having a concave unthreaded portion slidably communicating with said rod;
   a threaded, partial nut member movably positioned by said traveling member in close proximity to said threaded rod;
   releasable means for threadedly coupling said nut with said rod; and
   means for transmitting force from said nut to said traveling member whereby on said rod rotating, when coupled to said nut, said traveling member is caused to move.

5. A device for engaging and disengaging a traveling member from a threaded rod, said deice including:
   a rotatable threaded rod;
   a traveling member receiving said rod through at least one unthreaded aperture therethrough;
   a threaded, partial nut member movably positioned in close proximity to said threaded rod;
   means for releasably coupling said nut with said rod; and means for causing motion of said traveling member in response to rotation of said rod to be a function of said coupling of said nut to said rod, said means for coupling said nut to said rod includes a movable shaft received by said traveling member, said shaft carrying a cam member, whereby on said shaft assuming one position said cam engages said nut and forces it into said coupling relationship, and on said shaft assuming a further position, said nut and rod are uncoupled.

6. A device for engaging and disengaging a traveling member from a threaded rod, said device including:
   a rotatable threaded rod; a traveling member receiving said rod through at least one unthreaded aperture therethrough;
   a threaded, partial nut member movably positioned in close proximity to said threaded rod;
   means for releasably coupling said nut with said rod; and means for causing motion of said traveling member in response to rotation of said rod to be a function of said coupling of said nut to said rod said nut is movably positioned within a cutaway portion of said traveling member, whereby the sides of said nut may exert a force on the sides of said cutaway portion.

7. An operator having:
   a central housing portion;
   rotatable yoke device position within said central housing, said yoke including means for rotating related equipment along therewith;
   cylinder linked to said central housing by tie rod means, and having a reciprocating piston device therein, said piston device including a piston positioned at one end of a piston rod, the other end of said piston rod extending within said central housing and connected to a traveling member;
   manually rotatable means having a handle grip portion positioned exterior of said central housing, with a threaded rod linked to said handle grip and extending within said central housing;
   means releasably connecting said threaded rod to said yoke device, said connecting means including;
   said traveling member being apertured for slidably receiving said threaded rod,
   threaded partial nut movably positioned proximate to said threaded rod,
   means for releasably engaging said nut with said threaded rod, and
   connector pin device carried by said traveling member extending through slotted portion of said yoke.

8. The operator of claim 7, and including:
   adjustable stop members carried by said housing, and a plurality of flange ears fixed relative to the stem of said yoke, in position to abut against said stop members at the end of each piston stroke.

9. The operator of claim 7 wherein said partial nut is positioned within a cut out portion of said traveling members, force being capable of being transmitted between said latter mentioned members through their adjacent sides, and said engaging means including a shaft passing through apertures in said traveling member, carrying a cam device positioned within said cut out portion of said traveling member, and having a rotatable lever portion, exterior of said housing, for causing cam rotation, and thereby causing said cam to force said nut into engagement with said threaded rod.

* * * * *